Aug. 8, 1950          L. J. HESS          2,518,009
COUPLING SCREWER

Filed Sept. 21, 1946          2 Sheets-Sheet 1

Inventor
Lawrence J. Hess
By R. S. A. Dougherty
Attorney

Aug. 8, 1950           L. J. HESS           2,518,009
COUPLING SCREWER
Filed Sept. 21, 1946           2 Sheets-Sheet 2
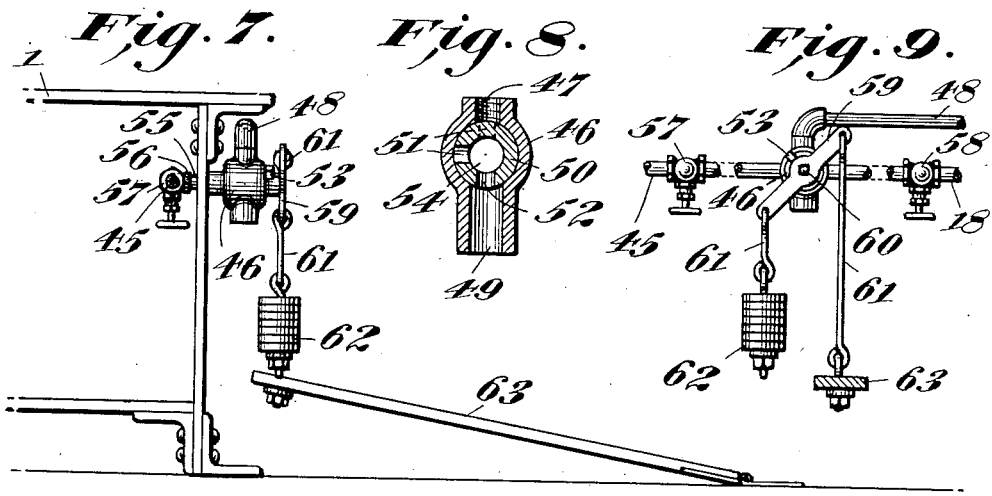
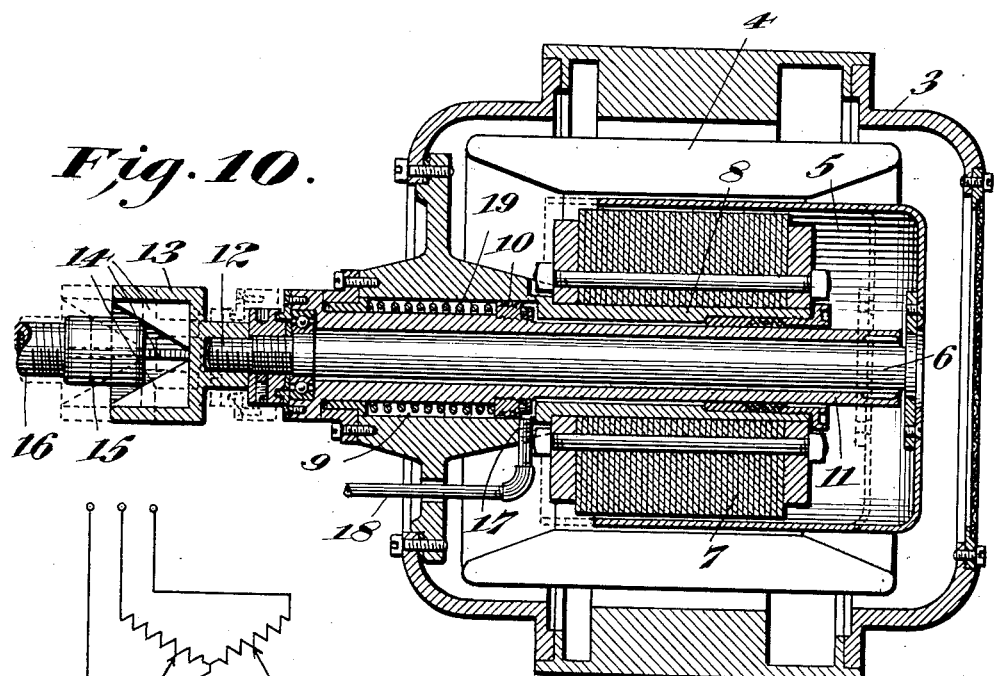
Inventor
Lawrence J. Hess
By R. S. A. Dougherty.
Attorney Patented Aug. 8, 1950

2,518,009

UNITED STATES PATENT OFFICE 2,518,009

COUPLING SCREWER

Lawrence J. Hess, Baltimore, Md., assignor to Bethlehem Steel Company, a corporation of Pennsylvania Application September 21, 1946, Serial No. 698,481

18 Claims. (Cl. 29—240)

This invention relates to apparatus adapted for use in screwing on pipe couplings on merchant pipe, on which the present specifications call for "handling tight."

This means that the coupling is screwed on just tight enough to stay in place during shipment but can be removed without much effort by the plumber on the job.

One of the objects of my invention relates to the manner of regulating the torque thereby increasing the speed of the machine.

Another object of the invention relates to a device for gripping the pipe and advancing it forward into the rotating chuck operated by the screwer motor.

Another object of my invention relates to the manner of advancing the chuck to the coupling.

Another object of the invention relates to the manner of controlling individually the reciprocating movements of the pipe gripping device and the rotating chuck.

With these and other objects in view which will become apparent in the following description and disclosure, this invention comprises the novel construction and combination hereinafter described and more particularly pointed out and defined in the appended claims.

Having thus given a general description of the objects of my invention I will now in order to make the same more clear, refer to the annexed two sheets of drawings forming a part of this specification and in which like characters of reference denote like parts.

Fig. 7 is a detail end elevation of a portion of my machine showing especially the foot controlling mechanism through means of which the fluid pressure to the motor and vise is controlled.

Fig. 8 is a vertical transverse section of the controlling valve taken on a line with the exhaust.

Fig. 9 is a detail view of the controlling valve in elevation, with the operating mechanism attached thereto.

Fig. 10 is a longitudinal section of the coupling screwer unit, and Fig. 11 is a diagram of an autotransformer with taps giving 9 voltages from 97–168 v.

Figure 1:
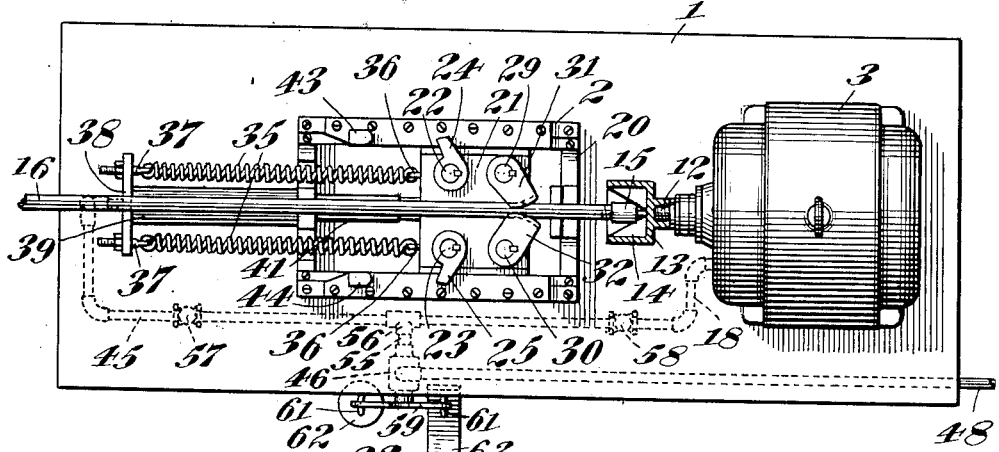
Figure 1 is a top plan view of my improved machine with the chuck shown in section.

Referring now to the various characters of reference on the drawings, the numeral 1 indicates the base frame of the machine upon which the vise member 2 and coupling screwer unit 3 are mounted.

The coupling screwer unit consists of a standard three-phase A. C. induction motor having a stator into which a special rotor arrangement is inserted. A cross section of this special motor is shown in Fig. 10. The stator 4 is a standard 10 H. P. 550 volt, 25 cycle, 500 R. P. M. winding which produces a rotating field. The strength of this rotating field can of course be regulated by the voltage applied to the winding. The rotor 5 is an aluminum cup shaped member which is quite thin, thus having a very low inertia or $WR^2$ value, and is mounted on one end of the shaft 6. The magnetic current is completed through the laminated part 7 which was the rotor in the original motor. This laminated part 7 is now mounted stationary on the quill 8, which in turn is fastened to the main frame of the motor, thus maintaining it in a central position within the cup shaped rotor 5 and the stator 4. The quill 8 has at its front end a cylinder 9 within which is a piston 10 which is attached to an inner tubular member 11 through which the shaft 6 extends. Attached to the front end of the shaft 6, as at 12, is a chuck 13 having tapered knives 14 mounted therein which are adapted to grip onto and rotate the coupling 15 on the end of a pipe 16, when the tubular member 11 together with the shaft 6 are moved forward by air pressure applied through port 17 having a pipe connection 18, whereby the shaft 6, rotor 5 and chuck 13 are advanced to the dotted line position indicated in Fig. 10. After the coupling 15 has been screwed on the air is exhausted from the cylinder 9 and the spring 19 returns these parts to the original position. The action of this device is as follows:

The cup shaped rotor 5 revolves due to the rotating field of the stator 4, thus turning the shaft 6 and the coupling chuck 13. Due to the air gaps, hysteresis losses, etc., this rotor 5 has a low torque as compared to a regular induction motor rotor. The pipe 16 on which a coupling 15 has been started by hand, is gripped in a vise so that it is centered on the center line of the rotor 5. Upon admission of air behind the piston 10 the tubular member 11, together with the rotating rotor 5, shaft 6 and chuck 13 move forward until the tapered knives 14 grip the coupling 15, and the rotation turns the coupling until the torque reaches a predetermined value, when it stops. Releasing of the air pressure allows the spring 19 to return the piston 10 and parts to their original position. The coupling is then released, and since resistance to rotation is removed, the rotor 5 revolves again. Using for example 550 volts 3-phase 25 cycle A. C. current, the amount of speed applied is set by varying the voltage which is done by a set of taps on a Y-connection three-phase autotransformer having taps giving 9 voltages from 97 to 168 v. as indicated diagrammatically in Fig. 11. The novel part of this unit is the light weight rotor which has minimum inertia and therefore the stalling torque is practically independent of the speed.

The above coupling screwer motor unit 3 was designed more especially for screwing on larger sized pipe couplings. It was however found that when the air pressure was reduced to the point where the thrust was not too great for one inch pipes or less, that the action was sluggish and the operaton slower than desirable. A vise was designed especially for ½", ¾" and 1" pipes as illustrated in Figs. 1 to 6, inclusive, which is adapted to grip the pipe and move it forward into the rotating clutch of the coupling screwer unit. When this vise is used for small sized pipe the internal piston 10 within the motor is not used.

Figure 2:
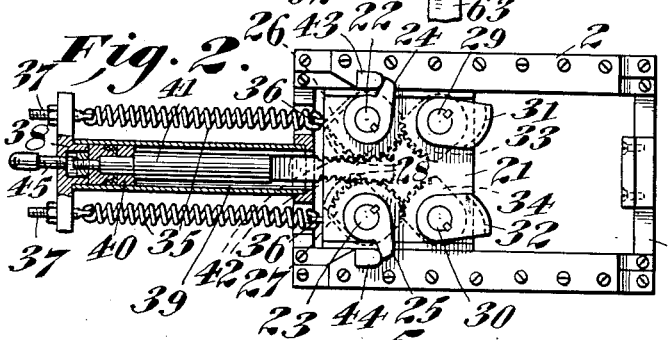
Fig. 2 is a top plan view of the vise or pipe gripping device with the jaws open and the operating cylinder in section.
Figure 3:
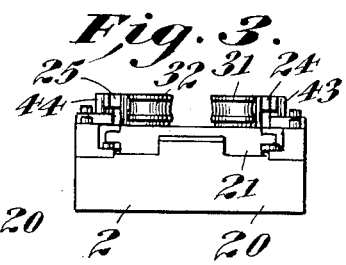
Fig. 3 is an end elevation of the vise as shown in Fig. 2.
Figure 4:
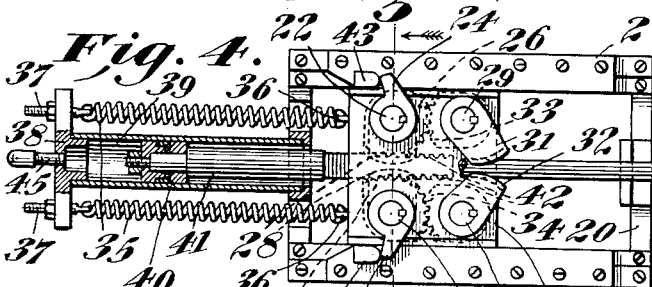
Fig. 4 is a top plan view similar to Fig. 2 with the jaws closed on the pipe at the beginning of the gripping operation.
Figure 5:
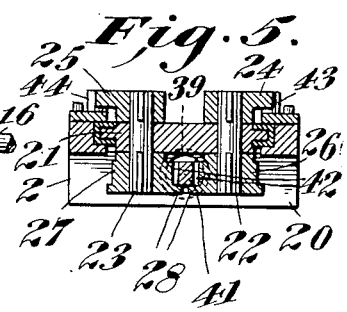
Fig. 5 is a transverse section taken on the line 5—5 of Fig. 4.
Figure 6:
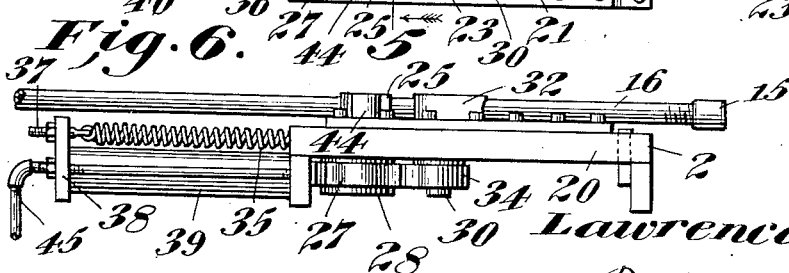
Fig. 6 is a side elevation of the vise.

Referring now to Figs. 1 to 6, there is shown a vise 2 especially adapted for use with smaller sized pipe having a frame 20 in which slides a platen 21 provided with spaced vertically disposed shafts 22 and 23 journaled therein having dogs 24 and 25 keyed to their upper ends, and sector gears 26 and 27 secured to their lower ends each having a shroud or flanged edge 28. The platen 21 is further provided with shafts 29 and 30 having gripping jaws 31 and 32 with curved faces at their upper ends adapted to grip the pipe, and having sector gears 33 and 34 secured to their lower ends meshing with sector gears 26 and 27 on shafts 22 and 23. The sector gears 26 and 27, 33 and 34 all have the same pitch line, but the segments of the gears 33 and 34 are considerably less than that of the segment gears 26 and 27. The platen 21 slides in the frame 20 and is under constant tension from a pair of springs 35 which have one end secured as at 36 to the rear end of the platen 21 and at their opposite ends to adjustable eye bolts 37 which are fastened to the rear head 38 of an air cylinder 39 provided with a piston 40 having a piston rod 41 with racks 42 adapted to engage the sector gears 26 and 27. As shown in Fig. 2 the springs 35 have pulled the platen back until the dogs 24 and 25 have engaged the stops 43 and 44 rotating the gears 26, 27, 33 and 34 to open the gripping jaws 31 and 32. In this position, the piston rod has been driven back through the gears and rack until the piston 40 engages the rear end of the cylinder head. The pipe 16 to be gripped is then dropped in from above. When air pressure is admitted through the pipe 45 behind the piston the platen 21 moves forward, and since the platen is restrained by the springs 35, it moves forward slowly as the dogs 24 and 25 rotate about the stops 43 and 44 thereby closing the gripping jaws 31 and 32, as indicated in Fig. 4. As soon as the gripping jaws are restrained from further rotation by gripping the pipe, the platen moves forward, carrying the pipe with it until the coupling on the pipe end is gripped in the chuck 13 of the screwer motor as indicated in Fig. 1.

In Figs. 1, 7, 8 and 9, I have illustrated means for controlling the fluid pressure to and from the cylinders 9 and 39, in which 46 indicates the controlling valve casing having an inlet port 47 for attaching a pipe connection 48 through which is received the fluid pressure from any suitable source of supply, and an exhaust port 49. A rotary three-way plug valve 50 having inlet and exhaust ports 51 and 52 made to register as desired with the ports 47 and 49 by means of a stop 53 and having a central outlet port 54, for communicating with the pipe 55 having a T-connection for coupling pipes 18 and 45 for admitting and exhausting the fluid pressure to and from the cylinders 9 and 39. The pipes 18 and 45 have valves 57 and 58 for controlling the supply of fluid pressure to the cylinders.

If it is only desired to use the cylinder 39 for the vise, valve 57 will be open and valve 58 closed, but if it is desired to use only the cylinder 9 in the coupling screwer motor unit valve 57 will be closed and valve 58 opened. However, it may be desirable in some cases to use the fluid pressure in both cylinders 9 and 39 at one time. A rocker arm 59 is attached to the valve stem 60 of the valve 50 with its ends extending outwardly on either side thereof. Eyes are formed in these ends for the reception of the upper ends of links 61. The lower end of one of said links has secured thereto a counterweight 62, while the opposite link has its lower end attached to a treadle 63.

Having given a general description of the machine, I will now, in order to make it more clear describe the steps in the operation:

Assuming that the vise 2, shown in Figs. 1 to 6 is used and the motor unit running, with the valve 57 open and valve 58 closed and the jaws 31 and 32 open as indicated in Fig. 2, the operator takes a length of pipe 16 and initially starts the coupling 15 manually on the threaded end of the pipe and inserts it in the machine between the open jaws, he then places his foot upon the treadle 63 and presses it downward which opens the valve 50 and allows the compressed air or other fluid pressure to flow into the cylinder 39 forcing forward the piston 40 and its rod 41 with the racks 42 engaging the teeth of the sector gears 27 and 28 on the lower ends of shafts 22 and 23 and provided with dogs 24 and 25 on their upper ends for engaging stops 43 and 44. The sector gears 27 and 28 mesh with sector gears 33 and 34 on shafts 29 and 30 and are provided at their upper ends with the rotating gripping jaws 31 and 32. When the pressure is admitted behind the piston 40 the platen 21 moves forward, and since the platen 21 is restrained by the springs 35 it at first moves forward slowly as the dogs 24 and 25 rotate about the stops 43 and 44, thereby closing the gripping jaws 31 and 32 on the pipe 16 as indicated in Fig. 4, of the drawings. As soon as the jaws 31 and 32 are restrained from further rotation by gripping the pipe 16, the whole platen with the parts associated therewith moves forward, carrying the pipe 16 with it until the coupling 15 on the end is gripped by the chuck 13 and rotated by the motor unit as indicated in Fig. 1.

At the completion of the screwing operation the operator takes his foot off the treadle 63, the air is then exhausted from the cylinder 39 and the springs 35 return the platen 21, carrying the pipe 16 with it until the dogs 24 and 25 engage the stops 43 and 44, when the grips open and release the pipe. The operation may then be repeated. The balance between the gripping pressure and the forward pressure is regulated by adjusting the eye-bolts 37 to give greater or less tension to the springs 35.

If it is desired to use only the coupling screwer motor unit for large sized pipe couplings, a length of pipe, on which a coupling has been started by hand is gripped in a vise so that it is centered on the center line of the rotor 5, valve 57 is closed and valve 58 opened. The operator then places his foot on the treadle 63 and presses it downward which opens the valve 50 and allows the compressed air or the like to flow into the cylinder 9, behind the piston 10 thereby the tubular member 11 together with the cup shaped rotor 5 and central shaft 6 will be moved forward until the tapered knives 14 of the chuck 13 grip the coupling and rotation turns the coupling until the torque reaches a predetermined value, when it stops. The operator then takes his foot off the treadle 63, the air is then exhausted from the cylinder 9, and the spring 19 returns the piston and actuated parts to the original position, the coupling is released, and since resistance to rotation is removed, the rotor 5 revolves again.

Although I have shown and described my improvements in considerable detail, I do not wish to be limited to the exact and specific details shown and described, but may use such substitutions, modifications or equivalents thereof, as are embraced within the scope of my invention, or as pointed out in the claims.

Having thus described my invention, what I claim and desire to secure by Letters Patent is:

1. In a machine for screwing a coupling on a pipe, a clamping device for holding a length of pipe with a coupling initially threaded on one end, a chuck for engaging the coupling, a motor for driving said chuck, means for adjusting the torque applied to the motor by varying the voltage, means for advancing the chuck into gripping engagement with the coupling, and means for rotating the coupling by the chuck until the torque of the motor reaches a predetermined value to stop the motor.

2. In a machine for screwing a coupling on a pipe, a clamping device operated by fluid pressure for holding a length of pipe with a coupling initially threaded on one end and for simultaneously advancing the length of pipe and coupling, a motor having a stator which produces a rotating field, means for regulating the voltage applied to the stator, a centrally disposed shaft mounted for reciprocating movement in the motor having an extending end portion, a cup shaped rotor secured to the other end of the shaft and extending into the stator, a chuck secured to the extending end of the shaft for engaging the coupling advanced by the clamping device, and means for rotating the coupling until the torque of the motor reaches a predetermined value to stop the motor.

3. In a machine for screwing a coupling on a pipe, a clamping device operated by fluid pressure for holding and simultaneously advancing a length of pipe with a coupling initially threaded on one end, a motor having a stator which produces a rotating field, a centrally disposed shaft mounted in the motor having an outwardly extending end portion, a tubular member mounted on the shaft, a stationary quill mounted on the tubular member, a cylinder formed in the quill, a piston in the cylinder secured to the tubular member, laminated plates mounted stationary on the quill for completing the magnetic circuit, a thin cup shaped rotor having a very low inertia value secured to the inner end of the shaft with its sides extending between the stator and the laminated plates, a chunk secured to the extending end of the shaft adapted to engage the coupling advanced by the clamping device, fluid pressure means for advancing the chuck into gripping engagement with the coupling, means for adjusting the torque applied to the motor by varying the voltage, means for rotating the coupling until the torque of the motor reaches a predetermined value thereby stopping the motor, and resilient means for returning the chuck to its original position.

4. In a machine for screwing a coupling on a pipe, a clamping device operated by fluid pressure for holding and simultaneously advancing a length of pipe with a coupling initially threaded on one end, a motor having a centrally disposed rotating shaft mounted therein with an outwardly extending end portion, a chuck secured to the extending end of the shaft adapted to engage the coupling, fluid pressure means for advancing the chuck into gripping engagement with the coupling, resilient means for returning the chuck to its original position, means for adjusting the torque applied to the motor by varying the voltage, and means for rotating the coupling until the torque of the motor reaches a predetermined value thereby stopping the motor.

5. In a machine for screwing a coupling on a pipe, a clamping device for holding a length of pipe with a coupling initially threaded on one end, a chuck for engaging the coupling, a motor for rotating the chuck, means for advancing the chuck into gripping engagement with the coupling, means for adjusting the torque of the motor, means for rotating the coupling by the chuck until the torque of the motor reaches a predetermined value to stop the motor, and means for retracting the chuck.

6. In a machine for screwing a coupling on a pipe, a clamping device for holding and reciprocating a length of pipe with a coupling initially threaded on one end, a motor having a stator which produces a rotating field, a centrally disposed shaft mounted in the motor having an outwardly extending end portion, a tubular member mounted on the shaft, a stationary quill mounted on the tubular member, a cylinder formed in the quill, a piston adapted to reciprocate in the cylinder secured to the tubular member, laminated plates mounted stationary on the quill for completing the magnetic circuit, a non-magnetic cup shaped rotor secured to the inner end of the shaft with its side wall extending between the stator and the laminated plates adapted to rotate the shaft, a chuck secured to the extending end of the shaft, means for admitting fluid pressure into the cylinder for advancing the chuck into gripping engagement with the coupling, means for adjusting the torque applied to the motor by varying the voltage, means for rotating the coupling until the torque of the motor reaches a predetermined value to stop the motor, means for exhausting the fluid pressure from the cylinder, and resilient means for returning the chuck to its original position.

7. In a machine for screwing a coupling on a pipe, a clamping device for holding and reciprocating a length of pipe with a coupling initially threaded on one end, a motor having a centrally disposed shaft mounted therein with an extending end portion, a rotor attached to the inner end of the shaft adapted to rotate said shaft, a chuck secured to the extending end portion of the shaft, fluid pressure means for advancing the chuck into gripping engagement with the coupling, means for adjusting the torque applied to the motor by varying the voltage, means for rotating the coupling until the torque of the motor reaches a predetermined value to stop the motor, and resilient means for returning the chuck to its original position.

8. In a machine for screwing a coupling on a pipe, a motor having a driven shaft with an extending end portion, a chuck secured to the extending end portion of the shaft, a clamping device for holding a length of pipe with a coupling initially threaded on one end, means for advancing the pipe by the clamping device until the chuck is in gripping engagement with the coupling, means for rotating the coupling by the chuck until the torque of the motor reaches a predetermined value to stop the motor, and means for retracting the pipe to its original position.

9. In a machine for screwing a coupling on a pipe, a motor having a driven shaft mounted therein with an extending end portion, a chuck secured to the extending end portion of said shaft, a clamping device for holding a length of pipe with a coupling initially threaded on one end, fluid pressure means for advancing the clamping device and the pipe until the chuck is in gripping engagement with the coupling, means for rotating the coupling by the chuck until the torque of the motor reaches a predetermined value to stop the motor, and resilient means for retracting the clamping device and the pipe to its original position.

10. In a machine for screwing a coupling on a pipe, a motor having a driven shaft mounted therein with an extending end portion, a chuck secured to the extending end portion of said driven shaft, a vise for holding a length of pipe with a coupling initially threaded on one end, a frame for the vise, a platen slidably mounted in the frame, clamping jaws mounted on the platen actuated by fluid pressure to clamp the pipe and simultaneously feed it forward until the coupling is in gripping engagement with the chuck, and resilient means for retracting the pipe.

11. In a machine for screwing a coupling on a pipe, a motor having a driven shaft mounted therein with an extending end portion, a chuck secured to the extending end portion of said shaft, fluid pressure means for advancing the chuck, a vise for holding a length of pipe with a coupling initially threaded on one end, a frame for the vise, a platen mounted for longitudinally sliding movement in the frame, a pair of shafts each having a dog attached to its upper end and a sector gear secured to its lower end, stops on the frame for engaging the dogs, a pair of shafts each having a jaw keyed to its upper end and a sector gear attached to its lower end meshing with the sector gears on the shafts for the dogs, a cylinder secured to one end of the frame, a piston in said cylinder having a piston rod with a rack for engaging and actuating the sector gears, means for controlling the supply of fluid pressure to the cylinder to close the clamping jaws on the pipe and move it forward until the coupling engages the chuck, and resilient means for retracting the platen until the dogs engage the stops and open the clamping jaws.

12. In a machine for screwing a coupling on a pipe, a motor having a driven shaft with an extending end portion, a chuck secured to the extending end portion of said shaft, a vise for holding a length of pipe with a coupling initially threaded on one end, said vise having a frame, a platen slidably mounted in the frame, clamping jaws rotatably mounted on the platen, fluid pressure means adapted to rotate the jaws to clamp the pipe and simultaneously advance it until the coupling engages the chuck, resilient means for retracting the platen with the pipe, and means for opening the clamping jaw when the platen is retracted.

13. In a machine for screwing a coupling on a pipe, a motor having a driven shaft with an extending end portion, a chuck secured to the extending end portion of said shaft, a vise for holding a length of pipe with a coupling initially threaded on one end, a frame for the vise, a platen mounted for sliding movement in the frame, a pair of shafts journaled in the platen each having a dog attached to its upper end and a sector gear secured to its lower end, stops on the frame for engaging the dogs when the platen is retracted, a pair of shafts journaled in the platen each having a clamping jaw keyed to its upper end and a sector gear attached to its lower end meshing with the sector gears on the shafts for the dogs, a cylinder secured to one end of the frame, a piston in said cylinder having an extending piston rod with racks for engaging and actuating the sector gears, means for controlling the supply of fluid pressure to the cylinder to close the clamping jaws on the pipe and advance it forward until the coupling engages the chuck, means for adjusting the torque of the motor, means for rotating the coupling by the chuck until the torque of the motor reaches a predetermined value to stop the motor, and resilient means for holding the platen at all times under tension and for retracting said platen until the dogs engage the stops to open the clamping jaws.

14. In a machine for screwing a coupling on a pipe, a motor having a driven shaft with an extending end portion, a chuck secured to the extending end portion of said shaft, a vise for holding a length of pipe with a coupling initially threaded on one end, a frame for the vise, a platen mounted for sliding movement in the frame, clamping jaws mounted for rotation on the platen, means operated by fluid pressure for rotating and clamping the jaws on the pipe and for simultaneously advancing said pipe until the coupling engages the chuck, means for adjusting the torque of the motor, means for rotating the coupling by the chuck until the torque of the motor reaches a predetermined value to stop the motor, and resilient means for holding the platen at all times under tension and for retracting said platen to open the clamping jaws.

15. In a machine for screwing a coupling on a pipe, a motor having a driven shaft with an extending end portion, a chuck secured to the extending end portion of said driven shaft, a vise for holding a length of pipe with a coupling initially threaded on one end, a frame for the vise, a platen slidably mounted in the frame, clamping jaws mounted for rotation on the platen and actuated by fluid pressure to clamp the pipe and simultaneously feed it forward until the coupling is in gripping engagement with the chuck, means for adjusting the torque applied to the motor by varying the voltage, means for rotating the coupling until the torque of the motor reaches a predetermined value to stop the motor, resilient means for holding the platen at all times under tension and for retracting said platen to open the clamping jaws, and means for adjusting the tension applied to the platen.

16. In a machine for screwing a coupling on a pipe, a motor having a driven shaft with an extending end portion, a chuck secured to the extending end portion of said shaft, a vise for holding a length of pipe with a coupling initially threaded on one end, a frame for the vise, a platen mounted for longitudinal sliding movement in the frame, a pair of shafts journaled in the platen each having a dog attached to its upper end and a sector gear secured to its lower end, a second pair of shafts journaled in the platen each having a clamping jaw keyed to its upper end and a sector gear attached to its lower end meshing with the sector gears on the shafts for the dogs, a cylinder secured to one end of the frame, a piston adapted to reciprocate in said cylinder having an extending piston rod with racks for engaging and actuating the sector gears, means for controlling the supply of fluid pressure to the cylinder to rotate and close the clamping jaws on the pipe and to simultaneously advance it forward until the coupling engages the chuck, means for retarding the initial forward movement of the platen, means for adjusting the torque of the motor, means for rotating the coupling by the chuck until the torque of the motor reaches a predetermined value to stop the motor, stops on the frame for engaging the dogs when the platen is retracted, resilient means for holding the platen at all times under tension and for retracting said platen until the dogs engage the stops and open the clamping jaws, and means for adjusting the tension on the platen.

17. In a machine for screwing a coupling on a pipe, a motor having a driven shaft with an extending end portion, a chuck secured to the extending end portion of said shaft, a vise for holding a length of pipe with a coupling initially threaded on one end, a frame for the vise, a platen mounted for longitudinal sliding movement in the frame, a pair of shafts disposed vertically and journaled in the platen each having a dog attached to its upper end and a sector gear secured to its lower end, a second pair of shafts vertically disposed and journaled in the platen each having a clamping jaw keyed to its upper end and a sector gear attached to its lower end meshing with the sector gears on the shafts for the dogs, stops on the frame for engaging the dogs when the platen is retracted, resilient means for holding the platen at all times under tension and normally retracted with the dogs engaging the stops, a cylinder secured to one end of the frame, a piston adapted to reciprocate in said cylinder having an extending piston rod with racks formed thereon for engaging and actuating the sector gears, means for controlling the supply of fluid pressure to the cylinder to rotate and close the clamping jaws on the pipe and simultaneously advance it forward until the coupling engages the chuck, and said resilient means for holding the platen under tension being adapted to restrain the platen to initially allow it to move forward slowly as the dogs rotate about the stops until the jaws grip the pipe.

18. In a machine for screwing a coupling on a pipe, a clamping device for holding and reciprocating a length of pipe with a coupling initially threaded on one end, a chuck for engaging the coupling, a motor for rotating the chuck, fluid pressure means actuated simultaneously from a single source of supply for moving the clamping device and the length of pipe and for advancing the chuck into gripping engagement with the coupling, means for adjusting the torque of the motor, means for rotating the coupling by the chuck until the torque of the motor reaches a predetermined value to stop the motor, and resilient means for retracting the chuck.

LAWRENCE J. HESS.

REFERENCES CITED

The following references are of record in the file of this patent:

UNITED STATES PATENTS

| Number | Name | Date |
|---|---|---|
| 609,990 | Lamme | Aug. 30, 1898 |
| 1,667,718 | Connell | May 1, 1928 |
| 1,765,825 | Cork | June 24, 1930 |
| 1,794,618 | Howe | Mar. 3, 1931 |
| 2,196,402 | Snyder | Apr. 9, 1940 |
| 2,431,316 | Dudley et al. | Nov. 25, 1947 |